(12) United States Patent
Sigler et al.

(10) Patent No.: US 10,421,148 B2
(45) Date of Patent: *Sep. 24, 2019

(54) EXTERNAL HEAT ASSISTED WELDING OF DISSIMILAR METAL WORKPIECES

(71) Applicant: GM GLOBAL TECHNOLOGY OPERATIONS LLC, Detroit, MI (US)

(72) Inventors: David R. Sigler, Shelby Township, MI (US); David S. Yang, Shanghai (CN); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 615 days.

This patent is subject to a terminal disclaimer.

(21) Appl. No.: 15/137,778

(22) Filed: Apr. 25, 2016

(65) Prior Publication Data
US 2017/0304925 A1    Oct. 26, 2017

(51) Int. Cl.
*B23K 11/20*    (2006.01)
*B23K 11/11*    (2006.01)
*B23K 103/20*   (2006.01)

(52) U.S. Cl.
CPC .............. *B23K 11/20* (2013.01); *B23K 11/115* (2013.01); *B23K 2103/20* (2018.08)

(58) Field of Classification Search
CPC ... B23K 11/115; B23K 11/20; B23K 2103/20; B23K 11/16; B23K 11/185; B23K 11/3018

(Continued)

(56) References Cited

U.S. PATENT DOCUMENTS

| | | |
|---|---|---|
| 5,302,797 A | 4/1994 | Yasuyama et al. |
| 5,304,769 A | 4/1994 | Ikegami et al. |

(Continued)

FOREIGN PATENT DOCUMENTS

| | | |
|---|---|---|
| CN | 1946506 | 4/2007 |
| CN | 102059439 | 5/2011 |

(Continued)

OTHER PUBLICATIONS

Machine Translation: WO-2013124181-A1, Doetzer Alfred, Aug. 2013.*

(Continued)

*Primary Examiner* — Dana Ross
*Assistant Examiner* — James F Sims, III
(74) *Attorney, Agent, or Firm* — Reising Ethington P.C.

(57) ABSTRACT

A method of resistance spot welding a workpiece stack-up that includes an aluminum workpiece and an adjacent overlapping steel workpiece is disclosed. The method uses a first welding electrode positioned proximate the aluminum workpiece and a second welding electrode positioned proximate the steel workpiece to effectuate the spot welding process. In an effort to positively affect the strength of the ultimately-formed weld joint, external heat may be supplied to the first welding electrode by an external heating source disposed in heat transfer relation with the first welding electrode either before or after, or both before or after, an electrical current is passed between the first and second welding electrodes to create a molten aluminum weld pool within the aluminum workpiece.

20 Claims, 6 Drawing Sheets

(58) Field of Classification Search
USPC .............................. 219/117.1, 118, 119, 120
See application file for complete search history.

(56) References Cited

U.S. PATENT DOCUMENTS

| | | | |
|---|---|---|---|
| 5,783,794 | A | 7/1998 | Oikawa et al. |
| 6,037,559 | A | 3/2000 | Okabe et al. |
| 7,850,059 | B2 | 12/2010 | Kobayashi et al. |
| 7,935,908 | B2 | 5/2011 | Nakagawa et al. |
| 7,951,465 | B2 | 5/2011 | Urushihara et al. |
| 7,984,840 | B2 | 7/2011 | Kobayashi et al. |
| 8,020,749 | B2 | 9/2011 | Kobayashi et al. |
| 8,058,584 | B2 | 11/2011 | Miyamoto et al. |
| 8,487,206 | B2 | 7/2013 | Urushihara et al. |
| 8,502,105 | B2 | 8/2013 | Tanaka et al. |
| 9,676,065 | B2 | 6/2017 | Sigler et al. |
| 9,839,971 | B2 * | 12/2017 | Schroth .................. B23K 11/34 |
| 2005/0218121 | A1 | 10/2005 | Hayashi et al. |
| 2005/0247679 | A1 | 11/2005 | Wang |
| 2007/0212565 | A1 | 9/2007 | Urushihara et al. |
| 2009/0255908 | A1 | 10/2009 | Sigler et al. |
| 2011/0097594 | A1 | 4/2011 | Tanaka et al. |
| 2012/0021240 | A1 | 1/2012 | Urushihara et al. |
| 2013/0189023 | A1 | 7/2013 | Spinella |
| 2013/0263638 | A1 | 10/2013 | Gugel et al. |
| 2014/0305912 | A1 | 10/2014 | Taniguchi et al. |
| 2014/0360986 | A1 | 12/2014 | Sigler et al. |
| 2015/0053654 | A1 | 2/2015 | Sigler et al. |
| 2015/0053655 | A1 | 2/2015 | Sigler et al. |
| 2015/0083693 | A1 | 3/2015 | Schroth et al. |
| 2015/0096961 | A1 | 4/2015 | Carlson et al. |
| 2015/0096962 | A1 | 4/2015 | Sigler et al. |
| 2015/0231729 | A1 | 8/2015 | Yang et al. |
| 2015/0231730 | A1 | 8/2015 | Sigler et al. |
| 2015/0352658 | A1 | 12/2015 | Yang et al. |
| 2015/0352659 | A1 | 12/2015 | Sigler et al. |
| 2016/0016252 | A1 | 1/2016 | Edwards, II |
| 2016/0158874 | A1 | 6/2016 | Wang et al. |
| 2016/0279732 | A1 | 9/2016 | Sigler et al. |
| 2016/0288242 | A1 | 10/2016 | Sigler et al. |
| 2016/0346865 | A1 | 12/2016 | Sigler et al. |
| 2017/0008118 | A1 | 1/2017 | Yang et al. |
| 2017/0106466 | A1 | 4/2017 | Sigler et al. |
| 2017/0157697 | A1 | 6/2017 | Yang et al. |
| 2017/0225262 | A1 | 8/2017 | Sigler et al. |
| 2017/0225263 | A1 | 8/2017 | Sigler et al. |
| 2017/0232548 | A1 | 8/2017 | Carlson et al. |
| 2017/0252853 | A1 | 9/2017 | Wang et al. |
| 2017/0282303 | A1 | 10/2017 | Wang et al. |
| 2017/0291246 | A1 | 10/2017 | Sigler et al. |
| 2017/0291247 | A1 | 10/2017 | Sigler et al. |
| 2017/0291248 | A1 | 10/2017 | Sigler et al. |
| 2017/0297134 | A1 | 10/2017 | Sigler et al. |
| 2017/0297135 | A1 | 10/2017 | Sigler et al. |
| 2017/0297136 | A1 | 10/2017 | Brown et al. |
| 2017/0297137 | A1 | 10/2017 | Perry et al. |
| 2017/0297138 | A1 | 10/2017 | Sigler et al. |
| 2017/0361392 | A1 | 12/2017 | Sigler et al. |

FOREIGN PATENT DOCUMENTS

| | | |
|---|---|---|
| CN | 102114574 | 7/2011 |
| JP | 11342477 | 12/1999 |
| JP | 2011224578 | 11/2011 |
| JP | 2013151017 | 8/2013 |
| WO | WO-2013124181 A1 * | 8/2013 ......... B23K 11/3063 |

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

English translation of CN 102059439 to Mazda Motor (published May 18, 2011).

English translation JP 2011224578 to Kobe Steel (published Nov. 10, 2011).

English translation of JP2013151017 to Mazda Motor (published Aug. 8, 2013).

Haselhuhn et al., U.S. Appl. No. 15/807,219 entitled "Electrode Weld Face Design," filed Nov. 8, 2017.

Sigler et al., U.S. Appl. No. 15/907,996 entitled "Improving Mechanical Performance of Al-Steel Weld Joints by Limiting Steel Sheet Deformation," filed Feb. 28, 2018.

Sigler et al., U.S. Appl. No. 15/920,784 entitled "Resistance Spot Welding Workpiece Stack-Ups Having a Steel Workpiece and an Aluminum Workpiece with a Steel Plate," filed Mar. 14, 2018.

Sigler et al., U.S. Appl. No. 15/976,163 entitled "Multi-Step Direct Welding of an Aluminum-Based Workpiece to a Steel Workpiece," filed May 10, 2018.

Yang et al., U.S. Appl. No. 15/992,748 entitled "Electrode for Resistance Spot Welding of Dissimilar Metals," filed May 30, 2018.

* cited by examiner

EXTERNAL HEAT ASSISTED WELDING OF DISSIMILAR METAL WORKPIECES

TECHNICAL FIELD

The technical field of this disclosure relates generally to resistance spot welding and, more particularly, to resistance spot welding an aluminum workpiece and an adjacent overlapping steel workpiece.

BACKGROUND

Resistance spot welding is a process used by a number of industries to join together two or more metal workpieces. The automotive industry, for example, often uses resistance spot welding to join together metal workpieces during the manufacture of vehicle closure members (e.g., a door, hood, trunk lid, or lift gate) and vehicle body structures (e.g., body sides and cross-members), among others. A number of spot welds are typically formed along a peripheral edge of the metal workpieces or some other bonding region to ensure the part is structurally sound. While spot welding has typically been practiced to join together certain similarly-composed metal workpieces—such as steel-to-steel and aluminum-to-aluminum—the desire to incorporate lighter weight materials into a vehicle body structure has generated interest in joining steel workpieces to aluminum workpieces by resistance spot welding. Other manufacturing industries including the aviation, maritime, railway, and building construction industries are also interested in developing effective and repeatable procedures for joining such dissimilar metal workpieces.

Resistance spot welding relies on the resistance to the flow of an electrical current through overlapping metal workpieces and across their faying interface(s) to generate heat. To carry out such a welding process, a set of facially opposed spot welding electrodes is clamped at aligned spots on opposite sides of the workpiece stack-up, which typically includes two or more metal workpieces arranged in lapped configuration. An electrical current is then passed through the metal workpieces from one welding electrode to the other. Resistance to the flow of this electrical current generates heat within the metal workpieces and at their faying interface(s). When the workpiece stack-up includes an aluminum workpiece and an adjacent overlapping steel workpiece, the heat generated at the faying interface and within the bulk material of those dissimilar metal workpieces initiates and grows a molten aluminum weld pool within the aluminum workpiece. The molten aluminum weld pool wets the adjacent faying surface of the steel workpiece and, upon cessation of the current flow, solidifies into a weld joint that bonds the two dissimilar workpieces together.

In practice, however, spot welding a steel workpiece to an aluminum workpiece is challenging since a number of characteristics of those two metals can adversely affect the strength—most notably the strength in peel and cross-tension—of the weld joint. For one, the aluminum workpiece usually contains a mechanically tough, electrically insulating, and self-healing refractory oxide surface layer. The oxide layer is typically comprised of aluminum oxide compounds, although other oxide compounds may also be present such as, for example, magnesium oxide compounds when the aluminum workpiece contains a magnesium-containing aluminum alloy. As a result of its physical properties, the refractory oxide surface layer has a tendency to remain intact at the faying interface of the aluminum and steel workpieces where it not only hinders the ability of the molten aluminum weld pool to wet the steel workpiece, but also provides a source of near-interface defects. The insulating nature of the surface oxide layer also raises the electrical contact resistance of the aluminum workpiece—namely, at the workpiece/electrode junction—making it difficult to effectively control and concentrate heat within the aluminum workpiece.

Apart from the challenges presented by the refractory oxide surface layer, the aluminum workpiece and the steel workpiece also possess different properties that can adversely affect the strength and properties of the weld joint. Specifically, aluminum has a relatively low melting point (~600° C.) and relatively low electrical and thermal resistivities, while steel has a relatively high melting point (~1500° C.) and relatively high electrical and thermal resistivities. As a consequence of these physical differences, most of the heat is generated in the steel workpiece during current flow such that a heat imbalance exists between the steel workpiece (higher temperature) and the aluminum workpiece (lower temperature). The combination of the heat imbalance created during current flow and the high thermal conductivity of the aluminum workpiece means that, immediately after the electrical current ceases, a situation occurs where heat is not disseminated symmetrically from the weld site. Instead, heat is conducted from the hotter steel workpiece through the aluminum workpiece towards the welding electrode on the other side of the aluminum workpiece, which creates a steep thermal gradient in that direction.

The development of a steep thermal gradient between the steel workpiece and the welding electrode on the other side of the aluminum workpiece is believed to weaken the resultant weld joint in two ways. First, because the steel workpiece retains heat for a longer duration than the aluminum workpiece after the flow of electrical current has ceased, the molten aluminum weld pool solidifies directionally, starting from the region nearest the colder welding electrode (often water cooled) proximate with the aluminum workpiece and propagating towards the faying interface. A solidification front of this kind tends to sweep or drive defects—such as gas porosity, shrinkage voids, and micro-cracking—towards and along the faying interface within the weld joint where oxide film residue defects are already present. Second, the sustained elevated temperature in the steel workpiece promotes the growth of a hard and brittle Fe—Al intermetallic layer within the weld joint contiguous with the adjacent faying surface of the steel workpiece. Having a dispersion of weld defects together with excessive growth of an Fe—Al intermetallic layer tends to reduce the peel and cross-tension strength of the weld joint.

In light of the aforementioned challenges, previous efforts to spot weld an aluminum workpiece and a steel workpiece have employed a weld schedule that specifies higher currents, longer weld times, or both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical fasteners such as self-piercing rivets and flow-drill screws have predominantly been used instead. Mechanical fasteners, however, take longer to put in place and have high consumable costs compared to spot welding. They also add weight to the vehicle—weight that is avoided when joining is accomplished by way of spot welding—that offsets some of the weight savings attained through the use of aluminum workpieces in the first place. Advancements in spot welding that would make the process more capable of joining steel and aluminum workpieces would thus be a welcome addition to the art.

SUMMARY OF THE DISCLOSURE

A workpiece stack-up that includes an aluminum workpiece and an adjacent overlapping steel workpiece, plus one or more optional aluminum and/or steel workpieces, may undergo resistance spot welding to form a weld joint that weld bonds the aluminum and steel workpieces together. The workpiece stack-up includes a first side provided by an aluminum workpiece surface and a second side provided by a steel workpiece surface. To facilitate spot welding, a first welding electrode is pressed against the first side of the stack-up proximate the aluminum workpiece of the pair of adjacent aluminum and steel workpieces and, likewise, a second welding electrode is pressed against the second side of the stack-up proximate the steel workpiece of the pair of adjacent aluminum and steel workpieces. The first and second welding electrodes may be constructed the same as or different from one another.

The first welding electrode is supplied with heat from an external heating source in an effort to positively affect the strength of the weld joint that weld bonds the aluminum and steel workpieces together. External heat may be supplied to the first welding electrode before and/or after electrical current is passed between the first and second welding electrodes to help offset the heat imbalance that develops between the pair of adjacent aluminum and steel workpieces when electrical current is passed between the welding electrodes and through the workpiece stack-up to form the weld joint. In particular, external heat may be supplied to the first welding electrode to realize the following: (1) to heat the first welding electrode to an elevated temperature prior to passing electrical current between the first and second welding electrodes, (2) to maintain the first welding electrode at a holding temperature that prevents full solidification of the molten aluminum weld pool created within the aluminum workpiece until the temperature of the steel workpiece has cooled to below the melting point (i.e., the solidus temperature) of the aluminum workpiece after the passage of electrical current between the first and second welding electrodes has ceased, or (3) to perform both of the aforementioned acts.

The use of the external heating source to supply heat to the first welding electrode during certain periods of time is believed to enhance the strength—most notably the peel strength and the cross-tension strength—of the weld joint in several ways. For instance, heating the first welding electrode to the elevated temperature introduces heat conductively into the aluminum workpiece when the weld face of the first welding electrode is pressed against the first side of the workpiece stack-up and, in turn, reduces the amount of heat that needs to be generated by passing electrical current between the weld faces of the first and second welding electrodes. As a result, it is possible to minimize the growth and thickness of the brittle Fe—Al intermetallic layer that forms within the weld joint along the steel workpiece. Furthermore, by maintaining the first welding electrode at the holding temperature to prevent full solidification of the molten aluminum weld pool until the steel workpiece cools down after the passage of electrical current has ceased, the transfer of heat is from the steel workpiece to the first welding electrode is suppressed and, thus, lateral heat transfer from the molten aluminum weld pool within the planes of the aluminum and steel workpieces is promoted. Such heat distribution causes the molten aluminum weld pool to solidify in a way that drives weld defects towards the center of the weld joint where they are less likely to affect the strength and mechanical properties of the joint.

DETAILED DESCRIPTION

The preferred and exemplary embodiment of the disclosed method of resistance spot welding an aluminum workpiece and an adjacent overlapping steel workpiece is shown in FIGS. 1-12. The disclosed method seeks to counter the heat imbalance that naturally develops between the aluminum and steel workpieces during current flow by supplying heat, when necessary, to the welding electrode located proximate to the aluminum workpiece from an external source. The introduction of external heat to the aluminum side welding electrode can be practiced in conjunction with limiting or halting a flow of coolant fluid through the electrode, if desired. By supplying heat to the aluminum side welding electrode at particular times during the resistance spot welding process, the growth of the Fe—Al intermetallic layer may be inhibited and/or the solidification behavior of the molten aluminum weld pool created within the aluminum workpiece may be altered to minimize the broad dissemination of weld defects at and along the bonding interface of the eventually-formed weld joint and the steel workpiece. Each of these effects is believed to enhance the strength of the weld joint.

Referring now to FIGS. 1-4, a workpiece stack-up 10 is shown in preparation for resistance spot welding according to the disclosed method. The workpiece stack-up 10 includes at least an aluminum workpiece 12 and a steel workpiece 14 that overlap and lie adjacent to one another at a weld site 16. Indeed, as will be described in greater detail below, the disclosed spot welding method is broadly applicable to a wide variety of workpiece stack-up configurations that include the pair of adjacent aluminum and steel workpieces 12, 14. The workpiece stack-up 10 may, for example, include only the two aluminum and steel workpieces 12, 14, or it may include an additional aluminum workpiece (aluminum-aluminum-steel) or an additional steel workpiece (aluminum-steel-steel) so long as the two workpieces of the same base metal composition are disposed next to each other in the stack-up 10. The workpiece stack-up 10 may even include more than three workpieces such as an aluminum-aluminum-steel-steel stack-up, an aluminum-aluminum-aluminum-steel stack-up, or an aluminum-steel-steel-steel stack-up.

Figure 1:
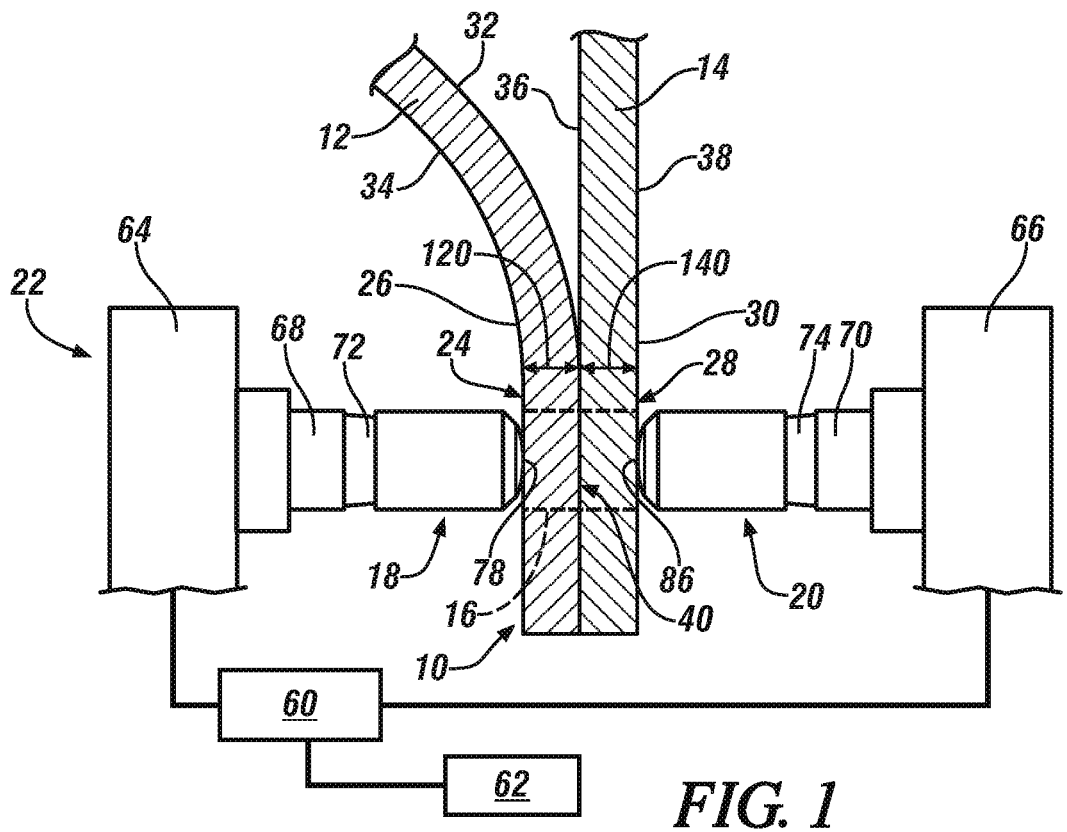
FIG. 1 is a general cross-sectional view of one embodiment of a workpiece stack-up, which includes an aluminum workpiece and an adjacent overlapping steel workpiece, situated between a set of opposed welding electrodes in preparation for resistance spot welding.
Figure 2:
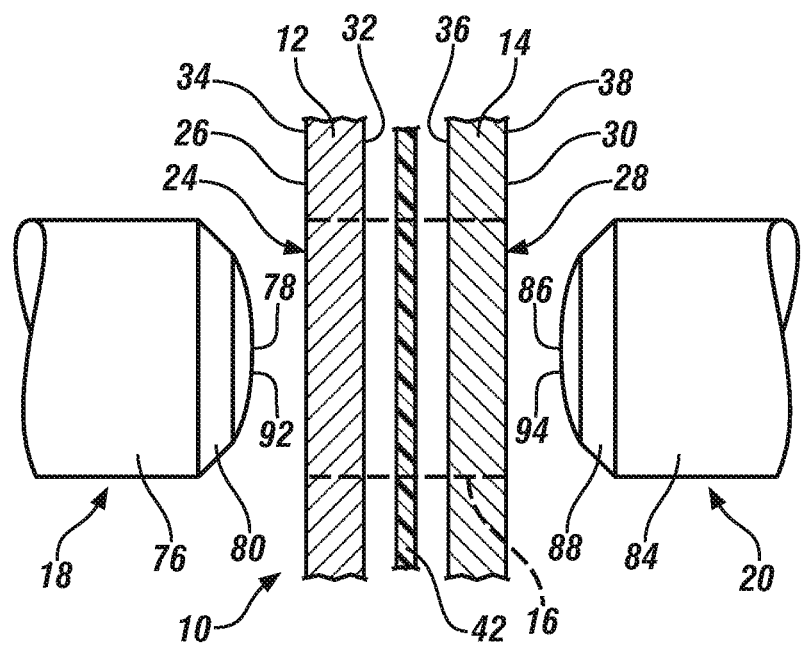
FIG. 2 is an exploded view of the workpiece stack-up and portions of the set of opposed welding electrodes shown in FIG. 1.

The workpiece stack-up 10 is illustrated in FIG. 1 along with first and second welding electrodes 18, 20 that are mechanically and electrically configured on a weld gun 22 (partially shown). The workpiece stack-up 10 has a first side 24 provided by an aluminum workpiece surface 26 and a second side 28 provided by a steel workpiece surface 30. The two sides 24, 28 of the workpiece stack-up 10 are accessible to the set of first and second welding electrodes 18, 20, respectively, at the weld site 16; that is, the first welding electrode 18 is arranged to make contact with and be pressed against the first side 24 of the workpiece stack-up 10 while the second welding electrode 20 is arranged to make contact with and be pressed against the second side 28. And while only one weld site 16 is depicted in the Figures, skilled artisans will appreciate that spot welding may be practiced according to the disclosed method at multiple different weld sites 16 on the same stack-up 10. FIG. 2 illustrates the workpiece stack-up 10 and opposed spot welding electrodes 18, 20 in exploded fashion for aiding in the description of the disclosed method.

The aluminum workpiece 12 includes an aluminum substrate that is either coated or uncoated. The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, and an aluminum-zinc alloy. If coated, the aluminum substrate may include a surface layer of a refractory oxide material comprised of aluminum oxide compounds and possibly other oxide compounds as well, such as magnesium oxide compounds if the aluminum substrate is an aluminum-magnesium alloy. The aluminum substrate may also be coated with a layer of zinc, tin, or a metal oxide conversion coating comprised of oxides of titanium, zirconium, chromium, or silicon, as described in US Pat. Pub. No. 2014/0360986. The surface layer may have a thickness ranging from 1 nm to 10 µm and may be present on each side of the aluminum substrate. Taking into account the thickness of the aluminum substrate and any optional surface layer that may be present, the aluminum workpiece 12 has a thickness 120 that ranges from 0.3 mm to about 6.0 mm, or more narrowly from 0.5 mm to 3.0 mm, at least at the weld site 16.

The aluminum substrate of the aluminum workpiece 12 may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, 6xx.x, or 7xx.x series aluminum alloy casting. Some specific kinds of aluminum alloys that may constitute the aluminum substrate include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si—Mg aluminum die casting alloy. The aluminum substrate may further be employed in a variety of tempers including annealed (O), strain hardened (H), and solution heat treated (T), if desired.

The steel workpiece 14 includes a steel substrate from any of a wide variety of strengths and grades that is either coated or uncoated. The steel substrate may be hot-rolled or cold-rolled and may be composed of steel such as mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 14 includes press-hardened steel (PHS). If coated, the steel substrate preferably includes a surface layer of zinc (e.g., hot-dip galvanized or electrogalvanized), a zinc-iron alloy (e.g., galvannealed), a zinc-nickel alloy, nickel, aluminum, an aluminum-magnesium alloy, an aluminum-zinc alloy, or an aluminum-silicon alloy, any of which may have a thickness of up to 50 µm and may be present on each side of the steel substrate. Taking into account the thickness of the steel substrate and any optional surface layer that may be present, the steel workpiece 14 has a thickness 140 that ranges from 0.3 mm and 6.0 mm, or more narrowly from 0.6 mm to 2.5 mm, at least at the weld site 16.

When the two workpieces 12, 14 are stacked-up for spot welding in the context of a "2T" stack-up embodiment, which is illustrated in FIG. 1, the aluminum workpiece 12 and the steel workpiece 14 present the first and second sides 24, 28 of the workpiece stack-up 10, respectively. In particular, the aluminum workpiece 12 includes a faying surface 32 and a back surface 34 and, likewise, the steel workpiece 14 includes a faying surface 36 and a back surface 38. The faying surfaces 32, 36 of the two workpieces 12, 14 overlap and confront one another to establish a faying interface 40 that extends through the weld site 16. The back surfaces 34, 38 of the aluminum and steel workpieces 12, 14, on the other hand, face away from one another in opposite directions at the weld site 16 and constitute, respectively, the aluminum workpiece surface 26 and the steel workpiece surface 30 of the first and second sides 24, 28 of the workpiece stack-up 10.

The term "faying interface 40" is used broadly in the present disclosure and is intended to encompass any overlapping and confronting relationship between the faying surfaces 32, 36 of the workpieces 12, 14 in which resistance spot welding can be practiced. The faying surfaces 32, 36 may, for example, be in direct contact with each other such that they physically abut and are not separated by a discrete intervening material layer. As another example, the faying surfaces 32, 36 may be in indirect contact with each other such as when they are separated by a discrete intervening material layer—and thus do not experience the type of interfacial physical abutment found in direct contact—yet are in close enough proximity to each other that resistance spot welding can still be practiced. This type of indirect contact between the faying surfaces 32, 36 of the aluminum and steel workpieces 12, 14 typically results when an intermediate organic material layer 42 (shown in FIG. 2 but not FIG. 1) is applied between the faying surfaces 32, 36 prior to spot welding of the workpiece stack-up 10.

The intermediate organic material layer 42 that may be present between the faying surfaces 32, 36 of the aluminum and steel workpieces 12, 14 is typically an adhesive layer that includes a structural thermosetting adhesive matrix. The structural thermosetting adhesive matrix may be any curable structural adhesive including, for example, a heat-curable epoxy or a heat-curable polyurethane. Some specific examples of heat-curable structural adhesives that may be used as the adhesive matrix include DOW Betamate 1486, Henkel 5089, and Uniseal 2343, all of which are commercially available. Additionally, the adhesive layer may further include optional filler particles, such as silica particles, dispersed throughout the thermosetting adhesive matrix to modify the viscosity or other mechanical properties of the adhesive matrix when cured. In other embodiments, the intermediate organic material layer 42 may be a sealer or a sound-damping material. The intermediate organic material layer 42 preferably has a thickness through the weld site 16 of 0.1 mm to 2.0 mm or, more narrowly, from 0.2 mm to 1.0 mm.

The intermediate organic material layer 42, if present, can be spot welded through rather easily at the temperatures and electrode clamping pressures attained at the weld site 16 during current flow. Under spot welding conditions, the organic material of the layer 42 is first laterally displaced under the high compressive force applied by the welding electrodes 18, 20, and any remaining portion of the layer 42 is burned off within the site 16 during current flow to leave behind only residual materials (e.g., carbon ash, filler particles, etc.) near the faying surface 36 of the steel workpiece 14. Outside of the weld site 16, however, the intermediate organic material layer 42 remains generally undisturbed and is able to provide its intended function. For example, when the intermediate organic material layer 42 is an adhesive layer, additional bonding between the faying surfaces 32, 36 of the aluminum and steel workpieces 12, 14 can be attained outside of and around the weld site 16. To achieve such additional bonding, the workpiece stack-up 10 may be heated in an ELPO-bake oven or other heating apparatus following spot welding to cure the structural thermosetting adhesive matrix of the adhesive layer that is still intact around the weld site 16 between the aluminum and steel workpieces 12, 14.

Figure 3:
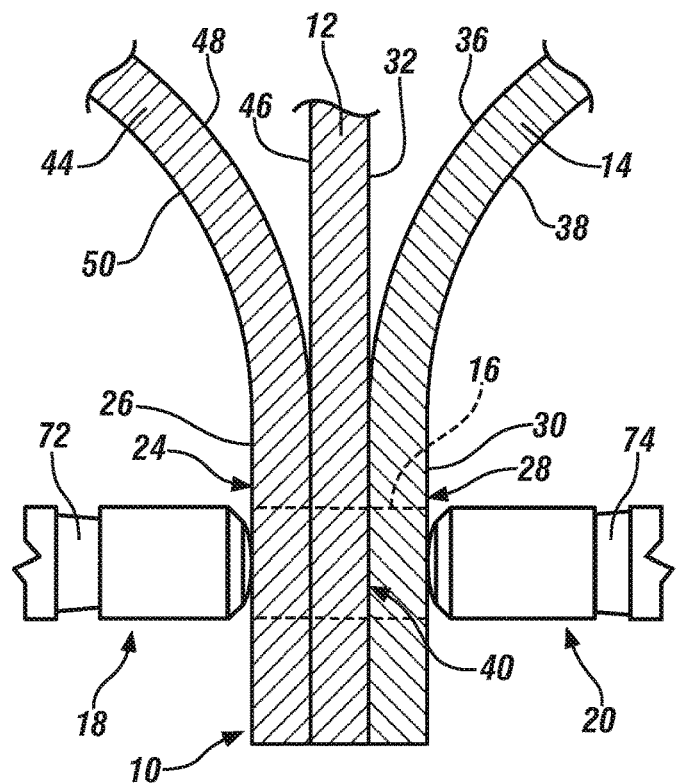
FIG. 3 is a general cross-sectional view of another embodiment of a workpiece stack-up, which includes an aluminum workpiece and an adjacent overlapping steel workpiece, situated between a set of opposed welding electrodes, although here the workpiece stack-up includes an additional aluminum workpiece (i.e., two aluminum workpieces and one steel workpiece)
Figure 4:
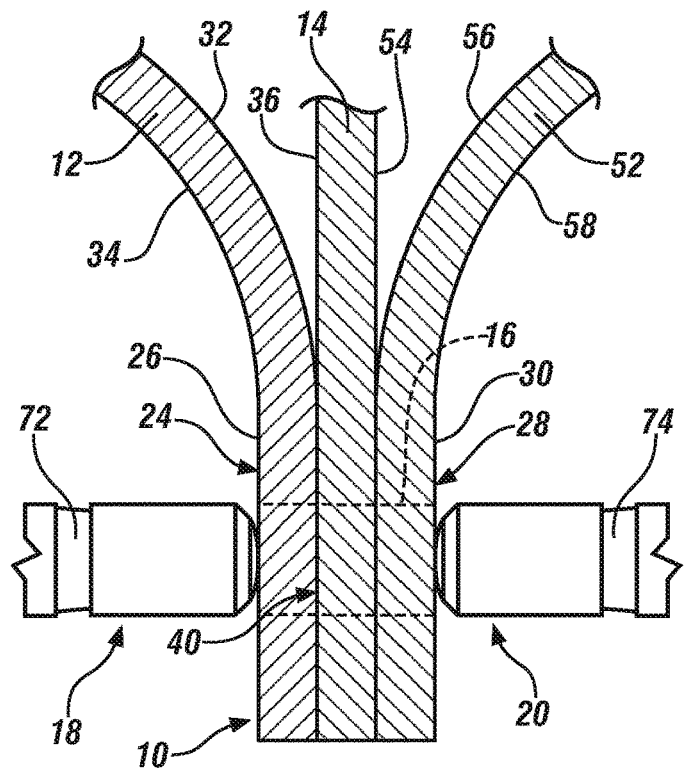
FIG. 4 is a general cross-sectional view of still another embodiment of a workpiece stack-up, which includes an aluminum workpiece and an adjacent overlapping steel workpiece, situated between a set of opposed welding electrodes, although here the workpiece stack-up includes an additional steel workpiece (i.e., one aluminum workpiece and two steel workpieces)

Of course, as shown in FIGS. 3-4, the workpiece stack-up 10 is not limited to the inclusion of only the pair of adjacent aluminum and steel workpieces 12, 14. The workpiece stack-up 10 may also include at least an additional aluminum workpiece or an additional steel workpiece—in addition to the pair of adjacent aluminum and steel workpieces 12, 14—so long as the additional workpiece is disposed adjacent to the workpiece 12, 14 of the same base metal composition; that is, any additional aluminum workpiece is disposed adjacent to the aluminum workpiece 12 and any additional steel workpiece is disposed adjacent to the steel workpiece 14. As for the characteristics of the additional workpiece(s), the descriptions of the aluminum workpiece 12 and the steel workpiece 14 provided above are applicable to any additional aluminum or steel workpiece that may be included in the stack-up 10. It should be noted, though, that while the same general descriptions apply, there is no requirement that the additional aluminum workpiece(s) and/or the additional steel workpiece(s) be identical in terms of composition, thickness, or form (e.g., wrought or cast) to the aluminum workpiece 12 and the steel workpiece 14, respectively, that lie next to each other within the workpiece stack-up 10.

As shown in FIG. 3, for example, the workpiece stack-up 10 may include the adjacent aluminum and steel workpieces 12, 14 described above along with an additional aluminum workpiece 44. Here, as shown, the additional aluminum workpiece 44 overlaps the adjacent aluminum and steel workpieces 12, 14 and lies next to the aluminum workpiece 12. When the additional aluminum workpiece 44 is so positioned, the back surface 38 of the steel workpiece 14 constitutes the steel workpiece surface 30 that provides the second side 28 of the workpiece stack-up 10, as before, while the aluminum workpiece 12 that lies adjacent to the steel workpiece 14 now includes a pair of opposed faying surfaces 32, 46. The faying surface 32 of the aluminum workpiece 12 that faces the faying surface 36 of the steel workpiece 14 continues to establish the faying interface 40 between the two workpieces 12, 14 as previously described. The other faying surface 46 of the aluminum workpiece 12 overlaps and confronts a faying surface 48 of the additional aluminum workpiece 44. As such, in this particular arrangement of lapped workpieces 12, 14, 44, a back surface 50 of the additional aluminum workpiece 44 now constitutes the aluminum workpiece surface 26 that provides the first side 24 of the workpiece stack-up 10.

In another example, as shown in FIG. 4, the workpiece stack-up 10 may include the adjacent aluminum and steel workpieces 12, 14 described above along with an additional steel workpiece 52. Here, as shown, the additional steel workpiece 52 overlaps the adjacent aluminum and steel workpieces 12, 14 and lies next to the steel workpiece 14. When the additional steel workpiece 52 is so positioned, the back surface 34 of the aluminum workpiece 12 constitutes the aluminum workpiece surface 26 that provides the first side 24 of the workpiece stack-up 10, as before, while the steel workpiece 14 that lies adjacent to the aluminum workpiece 12 now includes a pair of opposed faying surfaces 36, 54. The faying surface 36 of the steel workpiece 14 that faces the faying surface 32 of the aluminum workpiece 12 continues to establish the faying interface 40 between the two workpieces 12, 14 as previously described. The other faying surface 54 of the steel workpiece 14 overlaps and confronts a faying surface 56 of the additional steel workpiece 52. As such, in this particular arrangement of lapped workpieces 12, 14, 52, a back surface 58 of the additional steel workpiece 52 now constitutes the steel workpiece surface 30 that provides the second side 28 of the workpiece stack-up 10.

Returning now to FIG. 1, the first welding electrode 18 and the second welding electrode 20 are used to pass electrical current through the workpiece stack-up 10 and across the faying interface 40 of the adjacent aluminum and steel workpieces 12, 14 at the weld site 16 regardless of whether additional aluminum and/or steel workpiece(s) are present. Each of the welding electrodes 18, 20 is carried by the weld gun 22, which may be of any suitable type including a C-type gun or an X-type gun. The spot welding operation may call for the weld gun 22 to be mounted to a robot capable of moving the weld gun 22 around the workpiece stack-up 10 as needed, or it may call for the weld gun 22 to be configured on a stationary pedestal in which case the workpiece stack-up 10 is manipulated and moved relative to the weld gun 22. Additionally, as illustrated schematically here, the weld gun 22 may be associated with a power supply 60 that delivers electrical current between the welding electrodes 18, 20 according to a programmed weld schedule administered by a weld controller 62. The weld gun 22 may also be fitted with coolant lines and associated control equipment in order to deliver a cooling fluid, such as water, to each of the welding electrodes 18, 20 during spot welding operations.

The weld gun 22 includes a first gun arm 64 and a second gun arm 66. The first gun arm 64 is fitted with a shank 68 that secures and retains the first welding electrode 18 and the second gun arm 66 is fitted with a shank 70 that secures and retains the second welding electrode 20. The secured retention of the welding electrodes 18, 20 on their respective shanks 68, 70 can be accomplished by way of shank adapters 72, 74 that are located at axial free ends of the shanks 68, 70. In terms of their positioning relative to the workpiece stack-up 10, the first welding electrode 18 is positioned for contact with the first side 24 of the stack-up 10, and, consequently, the second welding electrode 20 is positioned for contact with the second side 28 of the stack-up 10. The first and second weld gun arms 64, 66 are operable to converge or pinch the welding electrodes 18, 20 towards each other and to impose a clamping force on the workpiece stack-up 10 at the weld site 16 once the electrodes 18, 20 are brought into contact with their respective workpiece stack-up sides 24, 28.

Figure 5:
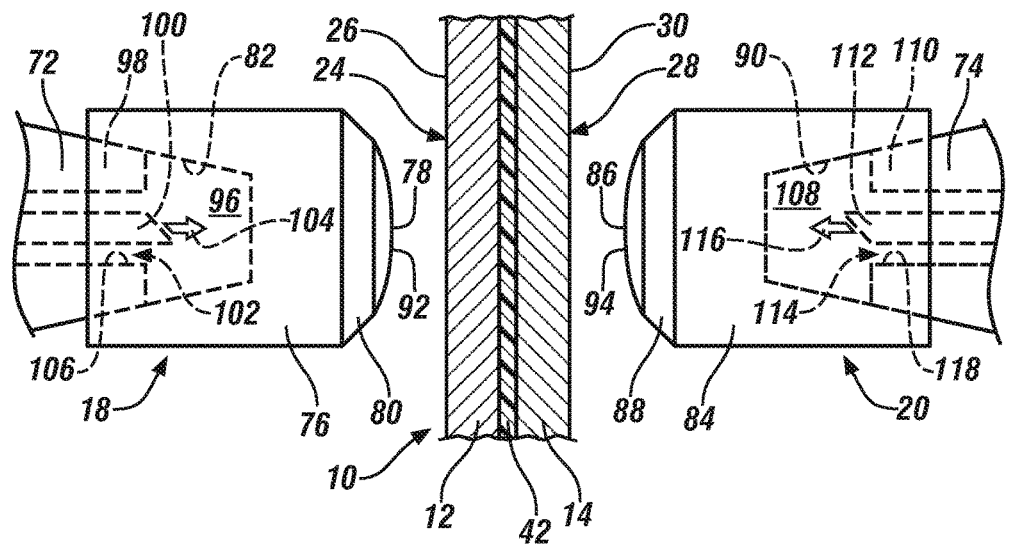
FIG. 5 depicts an elevated view of the workpiece stack-up and the set of opposed welding electrodes along with details related to a cooling pocket defined within the electrode body of each of the welding electrodes.
Figure 6:
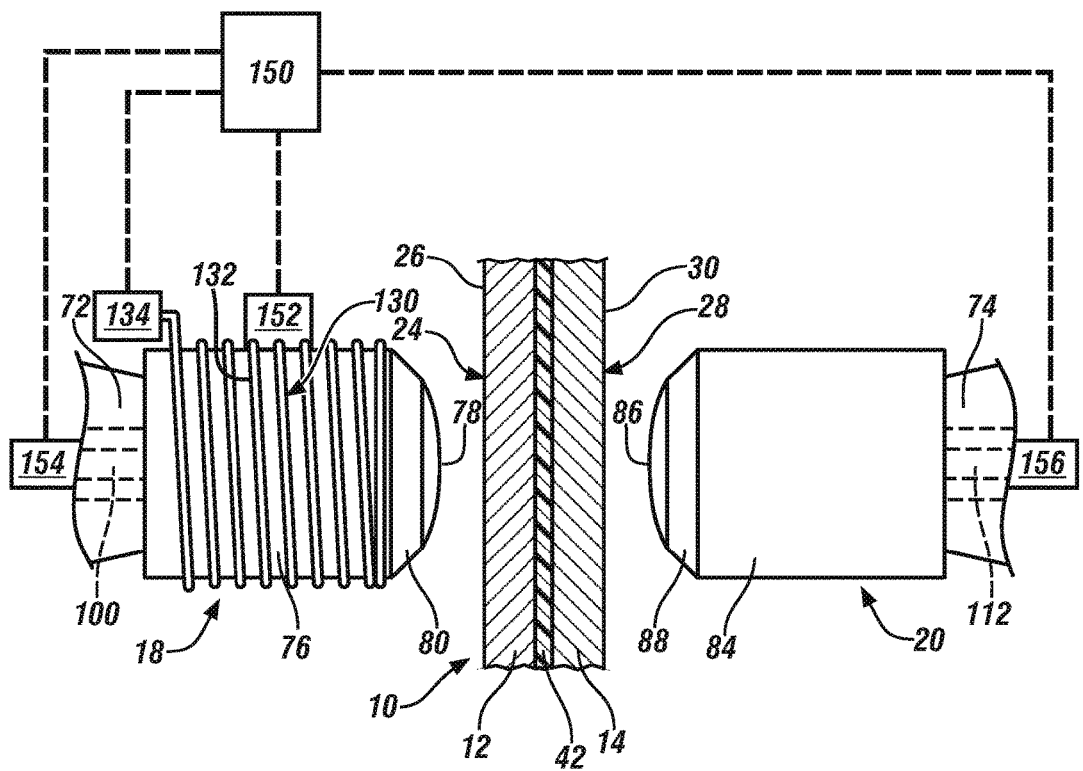
FIG. 6 depicts an elevated view of the workpiece stack-up and the set of opposed welding electrodes along with details related to one embodiment of an external heating source disposed in heat transfer relation with the welding electrode located proximate the aluminum workpiece that lies adjacent to the steel workpiece.

The first and second welding electrodes 18, 20 may be constructed similarly of dissimilarly from one another and can assume a wide variety of electrode designs. As shown in FIGS. 2 and 5, the first welding electrode 18 includes an electrode body 76 that supports a first weld face 78, and optionally includes a transition nose 80 that upwardly displaces the first weld face 78 from the electrode body 76. The electrode body 76 of the first welding electrode 18 defines an internal recess 82 that is open at an end of the body 76 opposite the first weld face 78. This internal recess 82 is accessible to and receives the shank adapter 72 associated with the shank 68 of the first gun arm 64. The second welding electrode 20 is constructed similarly to the first welding electrode 18 and, accordingly, includes an electrode body 84 that supports a second weld face 86, and optionally includes a transition nose 88 that upwardly displaces the second weld face 86 from the electrode body 84. The electrode body 84 of the second welding electrode 20 also defines an internal recess 90 that is open at an end of the body 84 opposite the second weld face 86. This internal recess 90 is accessible to and receives the shank adapter 74 associated with the shank 70 of the second gun arm 66.

A broad range of electrode weld face designs may be implemented for the welding electrodes 18, 20. Each of the first and second weld faces 78, 86 may, for example, have a diameter at its widest dimension that ranges from 3 mm to 20 mm, with the first weld face 78 preferably having a diameter in the range of 6 mm to 20 mm, or more narrowly 8 mm to 15 mm, and the second weld face 86 preferably having a diameter in the range of 3 mm to 16 mm, or more narrowly 4 mm to 8 mm. Additionally, the first weld face 78 includes a first base weld face surface 92 and the second weld face 86 includes a second base weld face surface 94, and each of the first and second base weld face surfaces 92, 94 may be planar or spherically domed. If spherically domed, the base weld face surfaces 92, 94 may have a radius of curvature that ranges from 15 mm to 400 mm, with the first base weld face surface 92 preferably having a radius of curvature ranging from 15 mm to 300 mm, or more narrowly 20 mm to 50 mm, and the second base weld face surface 94 preferably having a radius of curvature ranging from 25 mm to 400 mm, or more narrowly 25 mm to 100 mm. Moreover, each of the first and second base weld face surfaces 92, 94 may be smooth, roughened, or may include a series of upstanding concentric rings of circular ridges such as the ridges disclosed in U.S. Pat. Nos. 8,222,560; 8,436,269; 8,927,894; or in U.S. Pat. Pub. No. 2013/0200048.

The first and second welding electrodes 18, 20 are equipped to receive a flow of cooling fluid during spot welding operations, as illustrated best in FIG. 5. Indeed, and referring for the moment to the first welding electrode 18, the distal region of the internal recess 82 of the electrode body 76, which is proximate the first weld face 78, constitutes a cooling pocket 96 when the first welding electrode 18 is retained on the shank adapter 72 associated with the shank 68 of the first gun arm 64. In particular, the shank adapter 72 includes an outer casing 98 and a cooling fluid supply tube 100 that extends through an internal bore 102 of the casing 98. The cooling fluid supply tube 100 is operable to introduce a flow 104 of cooling fluid, preferably water, into the cooling pocket 96. The flow 104 of cooling fluid passes through the cooling pocket 96 and eventually exits the cooling pocket 96 through an annular return channel 106 of the internal bore 102 that fluidly communicates with the cooling pocket 96 and surrounds the cooling fluid supply tube 100. The flow 104 of cooling fluid through the first welding electrode 18 may be set to anywhere from 0 gal/min, which occurs when the flow 104 is halted, to a maximum flow rate that typically ranges from 0.5 gal/min to 5 gal/min, and the temperature of the flow 104 of cooling fluid is typically 32° C. or less.

The second welding electrode 20 is constructed to receive a flow of cooling fluid in generally the same way as the first welding electrode 18. That is, the distal region of the internal recess 90 of the electrode body 84, which is proximate the second weld face 86, constitutes a cooling pocket 108 when the second welding electrode 20 is retained on the shank adapter 74 associated with the shank 70 of the second gun arm 66. In particular, as before, the shank adapter 74 includes an outer casing 110 and a cooling fluid supply tube 112 that extends through an internal bore 114 of the casing 110. The cooling fluid supply tube 112 is operable to introduce a flow 116 of cooling fluid, preferably water, into the cooling pocket 108. The flow 116 of cooling fluid passes through the cooling pocket 108 and eventually exits the cooling pocket 108 through an annular return channel 118 of the internal bore 114 that fluidly communicates with the cooling pocket 108 and surrounds the cooling fluid supply tube 112. The flow 116 of cooling fluid through the second welding electrode 20 may be set to anywhere from 0 gal/min, which occurs when the flow 116 is halted, to a maximum flow rate that typically ranges from 0.5 gal/min to 5.0 gal/min, and the temperature of the flow 116 of cooling fluid is typically 32° C. or less.

Each of the first and second welding electrodes 18, 20 are formed from an electrically conductive material such as, for example, a copper alloy. One specific example is a C15000 copper-zirconium alloy (CuZr) that contains 0.10 wt % to 0.20 wt % zirconium and the balance copper. Other copper alloys may of course be employed including a copper-chromium alloy (CuCr) or a copper-chromium-zirconium alloy (CuCrZr). A specific example of each of the aforementioned copper alloys is a C18200 copper chromium alloy that includes 0.6 wt % to 1.2 wt % chromium and the balance copper and a C18150 copper-chromium-zirconium alloy that includes 0.5 wt % to 1.5 wt % chromium, 0.02 wt % to 0.2 wt % zirconium, and the balance copper. Still further, other compositions that possess suitable mechanical and electrical/thermal conductivity properties may also be used. For example, at least the weld face 78 of the first welding electrode 18 may be composed of a refractory metal (e.g., molybdenum or tungsten) or a refractory metal composite (e.g. tungsten-copper) as disclosed in U.S. Pat. No 10,259,071.

Figure 11:
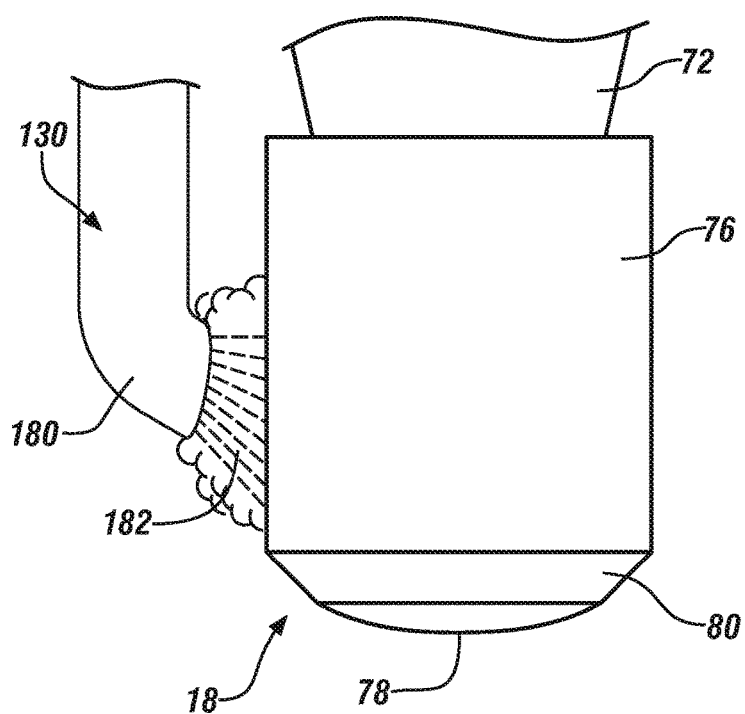
FIG. 11 depicts an elevated view of an alternative embodiment of an external heating source disposed in heat transfer relation with the welding electrode located proximate the aluminum workpiece that overlaps and lies adjacent to the steel workpiece.
Figure 12:
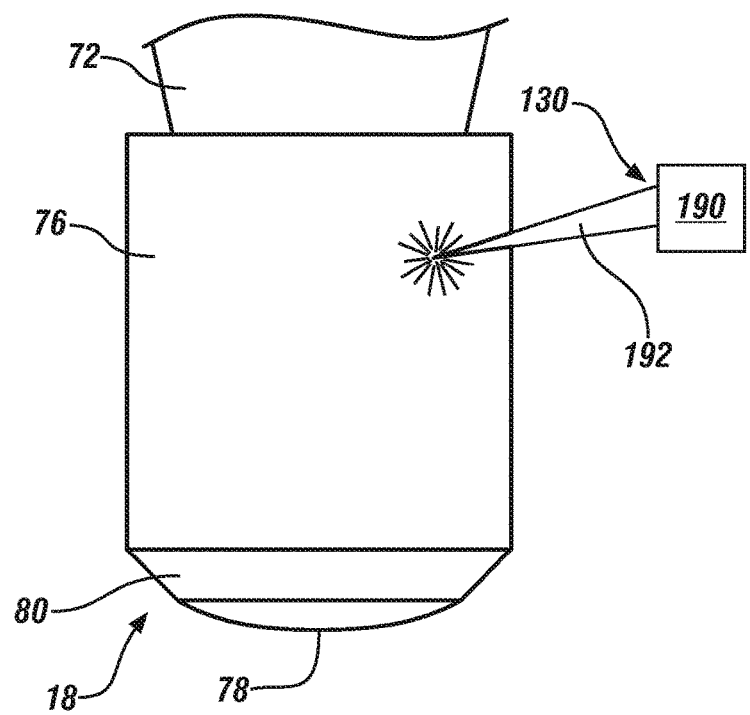
FIG. 12 depicts an elevated view of still another alternative embodiment of an external heating source disposed in heat transfer relation with the welding electrode located proximate the aluminum workpiece that overlaps and lies adjacent to the steel workpiece.

To provide a mechanism for introducing heat into the first welding electrode 18, which allows the temperature of the first welding electrode 18 to be controlled both before and after electrical current is passed between the welding electrodes 18, 20 during spot welding, an external heating source 130 is disposed in heat transfer relation with the first welding electrode 18. This is shown specifically in FIG. 6. In other words, the external heating source 130 is configured to supply heat to the first welding electrode 18 when activated. In a preferred embodiment, as shown here in FIG. 6, the external heating source 130 comprises a resistive heating element 132 that contacts and encircles the electrode body 76 and is electrically coupled to a heating circuit power supply 134. The resistive heating element 132 may be a resistive wire, such as a nickel-chrome wire, that is wrapped around the electrode body 76 multiple times, and the heating circuit power supply 134 may use any power source that can pass electrical current through the resistive heating element 132 to generate heat. Alternative embodiments of the external heating source 130 are of course possible and, in fact, several such alternative embodiments are depicted in FIGS. 11-12.

The external heating source 130 is controlled by a heating process controller 150 that includes, generally, a processing unit, programmable I/O peripherals, and an internal or external memory that stores computer readable operating instructions for operating the external heating source 130, as well as other features such as analog-to-digital converters and timers. The heating process controller receives input temperature data from a temperature sensor 152 and a flow rate meter 154 associated with the first welding electrode 18, as well as a flow rate meter 156 associated with the second welding electrode 20. The temperature sensor 152 measures the temperature of the first welding electrode 18 at any given time and transmits that data to the controller 150. The temperature sensor 152 may be a thermocouple that is installed on or in the first welding electrode 18, or it may be an optical infrared thermometer in the form of a spot IR thermometer or a thermal imager located in the vicinity of the first welding electrode 18 as needed for noncontact temperature measurement. The flow rate meters 154, 156 measure the rate at which the flow 104 of cooling fluid is moving through the first welding electrode 18 and the rate at which the flow 116 of cooling fluid is moving through the second welding electrode 20, respectively, at any given time and transmit that data to the controller 150 as well.

The heating process controller 150 controls the external heating source 130 by dictating how much electrical current is passed through the resistive heating element 132 based on information obtained and derived from the temperature sensor 152 and the flow meters 154, 156. In particular, the operating instructions loaded onto the controller 150 may include a lookup table, programmed equations or algorithms that are based on simulated modeling or experimental data, or some other data processing mechanism that can determine the appropriate operating conditions of the external heating source 130 at any given time based on certain desired results or outcomes of the disclosed method and the output signals needed to achieve that condition. As applicable to the disclosed method, the heating process controller 150 manages the amount of external heat supplied to the first welding electrode 18 before and/or after electrical current is passed between the first and second welding electrode 18, 20 to help offset the heat imbalance that develops between the pair of adjacent aluminum and steel workpieces 12, 14 when electrical current flows through the workpiece stack-up 10.

Figure 7:
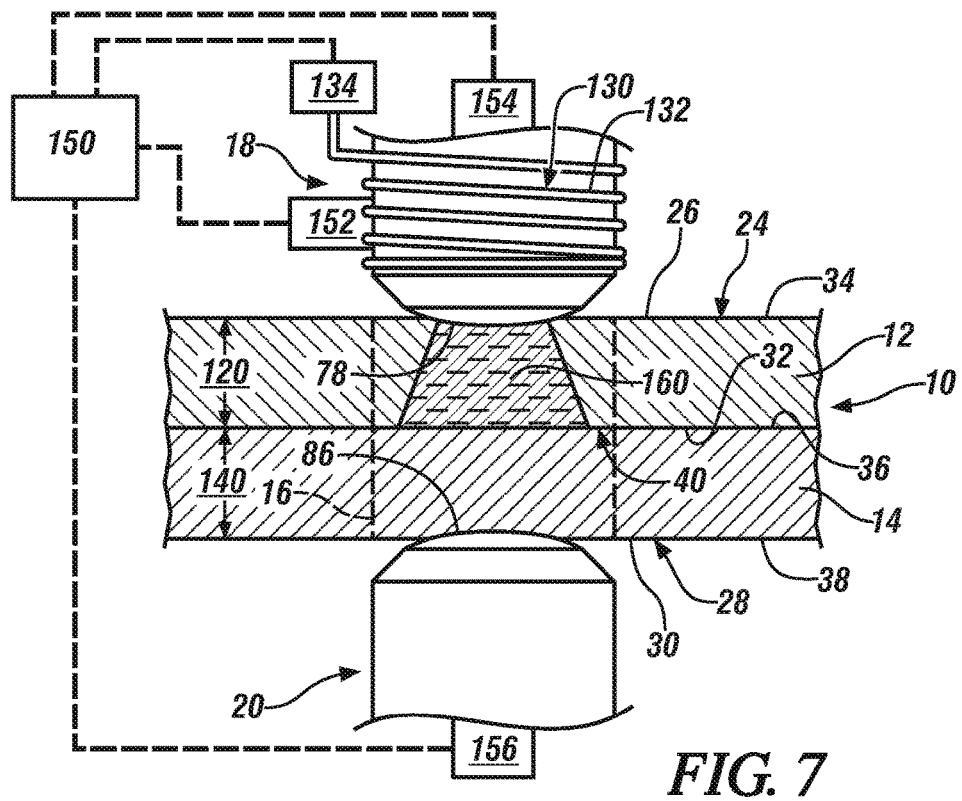
FIG. 7 is a general view of the workpiece stack-up (in cross-section) and the set of opposed welding electrodes during passage of electrical current between the weld faces of the opposed welding electrodes and through the stack-up, wherein the passage of electrical current has caused melting of the aluminum workpiece that lies adjacent to the steel workpiece and the creation of a molten aluminum weld pool within the aluminum workpiece.
Figure 8:
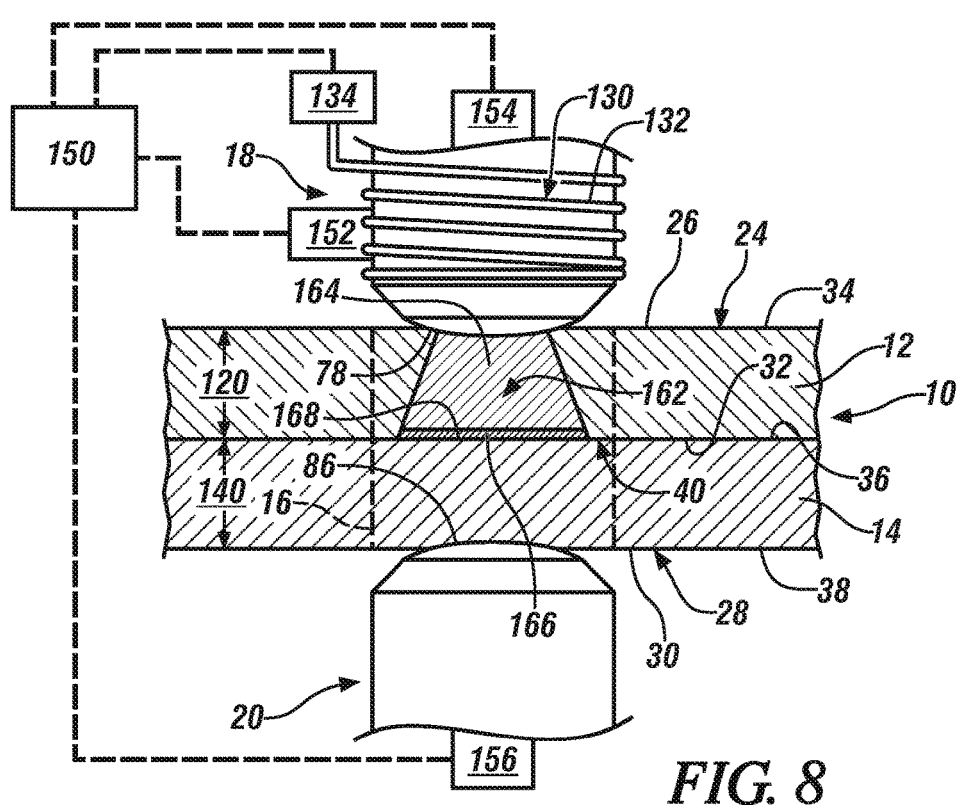
FIG. 8 is a general view of the workpiece stack-up (in cross-section) and the set of opposed welding electrodes after passage of electrical current between the weld faces of the opposed welding electrodes and through the stack-up has ceased, thus allowing the molten aluminum weld pool to solidify into a weld joint that weld bonds the pair of adjacent aluminum and steel workpieces together.

Referring now to FIGS. 1 and 7-8, the disclosed method will now be described in relation to the "2T" workpiece stack-up that includes only the pair of adjacent aluminum and steel workpieces 12, 14. The presence of additional workpieces in the workpiece stack-up 10 including, for example, the additional aluminum or steel workpieces 44, 52 described above, does not affect how the spot welding method is carried out or have any substantial effect on the joining mechanism that takes place at the faying interface 40 of the adjacent aluminum and steel workpieces 12, 14. The more-detailed discussion provided below thus applies equally to instances in which the workpiece stack-up 10 is a "3T" stack-up that includes the additional aluminum workpiece 44 (FIG. 3) or the additional steel workpiece 52 (FIG. 4), as well as "4T" stack-ups, despite the fact that those additional workpieces are not illustrated in FIGS. 1 and 7-8.

At the onset of the disclosed resistance spot welding method, which is depicted in FIG. 1, the workpiece stack-up 10 is located between the first welding electrode 18 and the opposed second welding electrode 20. The weld face 78 of the first welding electrode 18 is positioned to contact the aluminum workpiece surface 26 of the first side 24 of the stack-up 10 and the weld face 86 of the second welding electrode 20 is positioned to contact the steel workpiece surface 30 of the second side 28. The weld gun 22 is then operated to converge the first and second welding electrodes 18, 20 relative to one another so that their respective weld faces 78, 86 are pressed against the opposite first and second sides 24, 28 of the stack-up 10 at the weld site 16. The weld faces 78, 86 are typically facially aligned with each other at the weld site 16 under a clamping force imposed on the workpiece stack-up 10. The imposed clamping force preferably ranges from 400 lb (pounds force) to 2000 lb or, more narrowly, from 600 lb to 1300 lb.

The first welding electrode 18 is heated to raise its temperature to an elevated temperature above ambient conditions before electrical current is passed between the opposed first and second welding electrodes 18, 20. This may involve heating the first welding electrode 18, and especially the first weld face 78, to an elevated temperature that does not exceed the melting point of the aluminum in the aluminum workpiece 12. Raising the temperature of the first welding electrode 18 to between 200° C. to 500° C. is particularly preferred. The act of raising the temperature of the first welding electrode 18 can be practiced at any time prior to current flow between the spot welding electrodes 18, 20 so long as the first welding electrode 18 is still at the elevated temperature when it contacts the aluminum workpiece surface 26 of the workpiece stack-up 10. For instance, the temperature of the first welding electrode 18 may be raised at any of the following times: (1) prior to contact being initiated between the fist weld face 78 and the aluminum workpiece surface 26 of the stack-up 10 when the first welding electrode 18 is spaced apart from the first side 24 of the workpiece stack-up 10, (2) while the first weld face 78 is contacting the aluminum workpiece surface 26 of the workpiece stack-up 10, or (3) during both of the aforementioned specified periods (i.e., periods (1) and (2)).

Turning back to FIGS. 5 and 7 for the moment, the heating of the first welding electrode 18 to the elevated temperature may be achieved by cooperatively limiting or altogether halting the flow 104 of cooling fluid through the first welding electrode 18 and supplying heat to the first welding electrode 18 from the external heating source 130. The exact degree to which the flow 104 of cooling fluid is limited or halted, and the exact amount of heat that is supplied to the first welding electrode 18 from the external heating source 130, is controlled by the heating process controller 150. The significance of heating the first welding electrode 18 to an elevated temperature prior to current flow between the welding electrodes 18, 20, and contacting the aluminum workpiece surface 26 of the first side 24 of the workpiece stack-up 10 with the first weld face 78 while the first welding electrode 18 is at the elevated temperature, is discussed below in greater detail including the effect that such heating has on the strength of the ultimately-formed weld joint.

After the weld faces 78, 86 of first and second welding electrodes 18, 20 are pressed against the first and second sides 24, 28 of the workpiece stack-up 10, respectively, electrical current is passed between the facially aligned weld faces 78, 86. The exchanged electrical current is preferably a DC (direct current) electrical current that is delivered by the power supply 60 which, as shown, electrically communicates with the first and second welding electrodes 18, 20. The power supply 60 is preferably a medium frequency direct current (MFDC) inverter power supply that includes a MFDC transformer. A MFDC transformer can be obtained commercially from a number of suppliers including Roman Manufacturing (Grand Rapids, Mich.), ARO Welding Technologies (Chesterfield Township, Mich.), and Bosch Rexroth (Charlotte, N.C.). The characteristics of the delivered electrical current are controlled by the weld controller 62. Specifically, the weld controller 62 allows a user to program a weld schedule that dictates the manner in which the electrical current is exchanged between the welding electrodes 18, 20. The weld schedule allows for customized control of the current level at any given time and the duration of current flow at any given current level, among others, and further allows for such attributes of the electrical current to be responsive to changes in very small time increments down to fractions of a millisecond.

The electrical current passed between the welding electrodes 18, 20 passes through the workpiece stack-up 10 and across the faying interface 40 established between the pair of adjacent aluminum and steel workpieces 12, 14. The exchanged electrical current may be constant or pulsed over time, or some combination of the two, and typically has a current level that ranges from 5 kA and 50 kA, except for possible "off" periods between pulses, and lasts for a duration of 40 ms to 2500 ms. Resistance to the flow of electrical current generates heat and eventually melts the aluminum workpiece 12 to create a molten aluminum weld pool 160 within the aluminum workpiece 12, as depicted in FIG. 7. The molten aluminum weld pool 160 wets the adjacent faying surface 36 of the steel workpiece 14 and extends into the aluminum workpiece 12 towards the back surface 34 (or the opposed faying surface 46). The molten aluminum weld pool 160 may penetrate a distance into the aluminum workpiece 12 that ranges from 20% to 100% of the thickness 120 of the aluminum workpiece 12 at the weld site 16. And, in terms of its composition, the molten aluminum weld pool 160 is composed predominantly of aluminum material derived from the aluminum workpiece 12.

The molten aluminum weld pool 160 solidifies into a weld joint 162 that weld bonds the aluminum and steel workpieces 12, 14 together after the passage of electrical current between the weld faces 78, 86 of the first and second welding electrodes 18, 20 ceases, as shown in FIG. 8. The weld joint 162 includes an aluminum weld nugget 164 and a Fe—Al intermetallic layer 166. The aluminum weld nugget 164 is comprised of resolidified aluminum and extends into the aluminum workpiece 12 to a distance that often ranges from 20% to 100% of the thickness 120 of the aluminum workpiece 12 at the weld site 16, just like the pre-existing molten aluminum weld pool 160. The Fe—Al intermetallic layer 166 is situated between the aluminum weld nugget 164 and the faying surface 36 of the steel workpiece 14. The Fe—Al intermetallic layer 166 is produced due to a reaction between the molten aluminum weld pool 160 and the steel workpiece 14 at spot welding temperatures, and typically includes $FeAl_3$ compounds, $Fe_2Al_5$ compounds, and possibly other intermetallic compounds, and usually exhibits a combined total thickness of 1 μm to 5 μm.

After the passage of electrical current between the welding electrodes 18, 20 ceases, and while the first weld face 78 is still pressed against the aluminum workpiece surface 26 of the first side 24 of the stack-up 10, the temperature of the first welding electrode 18 and, in particular, the first weld face 78, is controlled to maintain its temperature at a holding temperature that prevents full solidification of the molten aluminum weld pool 160 into the weld joint 162 until a temperature of the steel workpiece 14 at the weld site 16 cools to below the melting point of the aluminum workpiece 12. Put differently, the temperature of the first welding electrode 18 is temporarily regulated to delay solidification of the molten aluminum weld pool 160 and to allow time for the more thermally resistive steel workpiece 14 to be cooled down, instead of cooling the first welding electrode 18 down as fast as possible in accordance with conventional spot welding practices. The controlled diminution of the temperature of the first welding electrode 18 helps prevent the formation of a steep thermal gradient between the steel workpiece 14 and the first welding electrode 18 that would otherwise develop on account of the relatively low thermal resistivity of the aluminum workpiece 12. Here, the holding temperature of the first welding electrode 18 is actually a range—and not necessarily a single degree of temperature—that spans from the melting point of the aluminum workpiece 12 to 100° C. or, more preferably, from 200° C. and 500° C.

The holding temperature of the first welding electrode 18 does not have to be maintained during the entire time that it takes the steel workpiece 14 to cool to ambient conditions. The holding temperature can, for instance, be maintained during the period that the temperature of the steel workpiece 14 is decreasing from a peak temperature that occurs at the moment the passage of electrical current between the welding electrodes 18, 20 is ceased until the temperature of the steel workpiece 14 falls to below the melting point of the aluminum workpiece 12. The melting point of the aluminum workpiece 12 can range from 570° C. to 660° C. on account of the variety of compositions of the aluminum workpiece 12. Once the temperature of the steel workpiece 14 falls below the melting point of the aluminum workpiece 12, which is preferably aided by running the flow 116 of cooling fluid through the second welding electrode 20 at the maximum flow rate, and can take anywhere from 5 ms to 50 ms, the control of the temperature of the first welding electrode 18 can be suspended and the electrode 18 can finish cooling down normally.

The temperature of the first welding electrode 18 may by maintained at the holding temperature by cooperatively controlling the flow 104 of cooling fluid through the first welding electrode 18 and the amount of heat supplied to the first welding electrode 18 by the external heating source 130 in order to regulate the rate of electrode cooling. In this way, the flow 104 of cooling fluid may be limited or altogether halted over time to alter the amount of heat being extracted from the first welding electrode 18, and the amount of heat supplied by the external heating source 130 over time may be fluctuated to alter the amount of heat transferred into the first welding electrode 18. The balance of extracting heat through the flow 104 of cooling fluid and adding heat from the external heating source 130 is controlled precisely by the heating process controller 150 based in input data received from the temperature sensor 152 and the flow rate meters 154, 156 as well as particularized data related to how the specific steel workpiece 14 included in the workpiece stack-up 10 will cool over time after current flow between the welding electrodes 18, 20 is ceased.

The first and second welding electrodes 18, 20 continue to exert their imposed clamping force on the workpiece stack-up 10 until the molten aluminum weld pool 160 has solidified into the weld joint 162. Once the weld joint 162 is formed, the clamping force imposed on the workpiece stack-up 10 at the weld site 16 is relieved and the first and second welding electrodes 18, 20 are retracted away from their respective sides 24, 28 of the stack-up 10. The workpiece stack-up 10 may now be moved relative to the weld gun 22 so that the first and second welding electrodes 18, 20 are positioned in facing alignment at another weld site 16 where the spot welding method is repeated. Or, rather than undergoing spot welding at a different site 16, the workpiece stack-up 10 may be moved away from the weld gun 22 to make room for another workpiece stack-up 10. The spot welding method can thus be carried out many times at different weld sites 16 on the same or different workpiece stack-up in a manufacturing setting.

The weld joint 162 formed by way of the disclosed method is expected to have enhanced strength—in particular enhanced peel and cross-tension strength—compared to weld joints formed according to conventional spot welding practices. The enhanced strength can be attributed to heating the first welding electrode 18 before electrical current flow commences between the welding electrodes 18, 20, maintaining the temperature of the first welding electrode 18 at the holding temperature while the steel workpiece 14 cools following cessation of electrical current flow between the welding electrodes 18, 20, or both. More specifically, the act of heating the first welding electrode 18 to an elevated temperature, and contacting the first weld face 78 with the first side 24 of the workpiece stack-up 10 at the weld site 16 while the first welding electrode 18 is at the elevated temperature, introduces heat conductively into the underlying aluminum workpiece 12 that lies adjacent to the steel workpiece 14. This added heat reduces the amount of heat required to be input from the steel workpiece 14 (by way of passing electrical current through the workpiece stack-up 10) to create the molten aluminum weld pool 160, which, in turn, is believed to reduce the thickness of the brittle Fe—Al intermetallic layer 166 that grows alongside the faying surface 36 of the steel workpieces 14 within the weld joint 162.

The act of maintaining the temperature of the first welding electrode 18 at the holding temperature while the steel workpiece 14 cools to below the melting point of the aluminum workpiece 12 is believed to positively contribute to the strength of the weld joint 162 by minimizing the presence of weld defects within the weld joint 162 at and along a bonding interface 168 of the weld joint 162 and the steel workpiece 14. The proliferation of weld defects at and along the bonding interface 168 is minimized by altering the solidification behavior of the molten aluminum weld pool 160 in a way that drives or sweeps weld defects towards the center of the weld joint 162 and away from the outer edge of the weld joint 162. Directing weld defects towards the center of the weld joint 162 is believed to have a favorable impact on peel and cross-tension strength since the center of the weld joint 162 is a more innocuous location for weld defects to be present than at the outer edge of the joint 162 next to the notch root that surrounds the weld joint 162.

Figure 9:
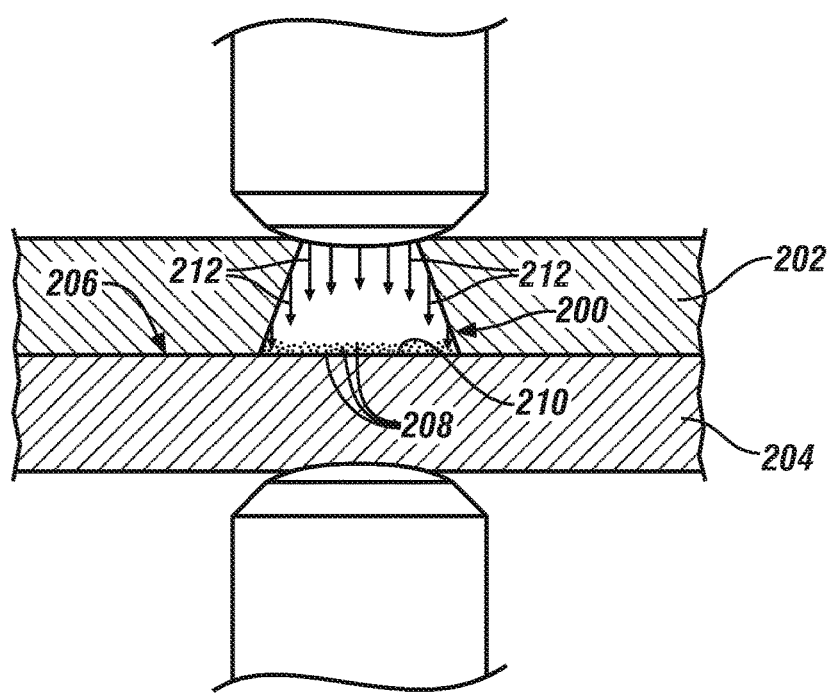
FIG. 9 illustrates the direction of the solidification front in a molten aluminum weld pool that solidifies from the point nearest the colder welding electrode located proximate the aluminum workpiece towards the faying surface of the steel workpiece as is common in conventional spot welding practices that do not employ features of the disclosed method.
Figure 10:
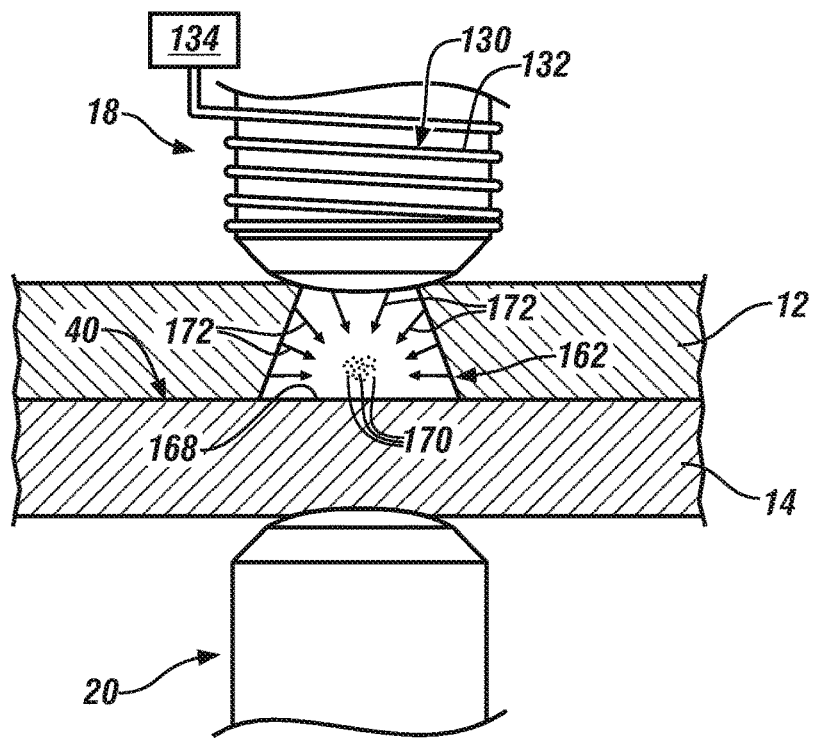
FIG. 10 illustrates the direction of the solidification front in a molten aluminum weld pool that solidifies from its outer edge towards its center as a result of using features of the disclosed method.

The influence that maintaining the holding temperature in the first welding electrode 18 after the cessation of current flow has on the solidification behavior of the molten aluminum weld pool 160 is represented generally in FIGS. 9-10. To provide some context, FIG. 9 depicts a weld joint 200 formed between an aluminum workpiece 202 and a steel workpiece 204 that overlap to establish a faying interface 206. The weld joint 200 illustrated here is representative of a weld joint formed by a conventional resistance spot welding process that does not employ features of the disclosed method as described above. As can be seen, weld defects 208 are dispersed at and along a bonding interface 210 of the weld joint 200 and the steel workpiece 204. These weld defects 208 may include shrinkage voids, gas porosity, oxide film residue, and micro-cracking, among others. When present and distributed at and along the bonding interface 210, the weld defects 208 may reduce the peel and cross-tension strength of the weld joint 200.

Without being bound by theory, it is believed that the dispersion of weld defects 208 at and along the bonding interface 210 is due at least in part to the solidification behavior of the pre-existing molten aluminum weld pool as it transforms into the weld joint 200. Specifically, a heat imbalance can develop between the much hotter steel workpiece 204 and the aluminum workpiece 202 because of the dissimilar physical properties of the two materials—namely, the much greater thermal and electrical resistivities of steel.

The steel workpiece 204 therefore acts as a heat source while the aluminum workpiece 202 acts as a heat conductor, creating a strong temperature gradient in the vertical direction that causes the molten aluminum weld pool to cool and solidify from the region nearest the cooler welding electrode proximate the aluminum workpiece 202 towards the steel workpiece 204. The path and direction of the solidification front is represented in FIG. 8 by arrows 212. As the solidification front progresses along this path 212, the weld defects 208 are swept toward the bonding interface 210 of the weld joint 200 and the steel workpiece 204 and eventually end up dispersed along the bonding interface 210 throughout weld joint 200.

By maintaining the temperature of the first welding electrode 18 at the holding temperature at least until the temperature of the steel workpiece 14 falls to below the melting point of the aluminum workpiece 12, the solidification behavior shown in FIG. 9 and the proliferation of weld defects that results can be avoided. Referring now to FIG. 10, an illustration of the weld joint 162 formed according to the disclosed method described above is shown. As can be seen, weld defects 170 in this weld joint 162 are congregated near the center of the joint 162 as opposed to being dispersed along the bonding interface 168 as depicted in FIG. 9. The weld defects 170 are swept towards the center of the weld joint 162 because the new temperature distribution within the workpiece stack-up 10 that results from maintaining the temperature of the first welding electrode 18 at the holding temperature causes the molten aluminum weld pool 160 to solidify from its outer edge towards its center. The path and direction of the solidification front is represented generally in FIG. 10 by arrows 172. The path 172, here, can sweep weld defects 170 into the center of the weld joint 162, either on or displaced from the bonding interface 168, and can further consolidate the defects 170 into larger-sized defects.

The act of maintaining the temperature of the first welding electrode 18 at the holding temperature at least temporarily, as described above, induces the solidification front 172 shown in FIG. 10 by discouraging the formation of a steep thermal gradient between the steel workpiece 14 and the first welding electrode 18 following the cessation of current flow. The more balanced heat distribution on opposite sides of the aluminum workpiece 12 changes the temperature distribution within the weld site 16 by creating three-dimensional radial temperature gradients around the molten aluminum weld pool 160 or enlarging already-existing three-dimensional radial temperature gradients. These new and/or enlarged radial temperature gradients slow directional heat flow into the first welding electrode 18 from the molten aluminum weld pool 160 and, thus, promote lateral heat flow into the planes of aluminum and steel workpieces 12, 14 that forces final solidification to occur in the center of the molten aluminum weld pool 160. In this way, weld defects such as shrinkage voids, gas voids, micro-cracks, and oxide film residue are driven toward and retained at the center of the weld joint 162, as shown, where they are less likely to adversely affect the strength of the joint 162.

A number of variations to the disclosed method described above and shown in FIGS. 1-10 can be implemented including alternative embodiments of the external heating source 130. For example, as shown in FIG. 11, the external heating source 130 may include a gas outlet tube 180 that is aimed at the first welding electrode 18 and supported on the first gun arm 64. The gas outlet tube 180 is configured to direct a stream of heated gas 182, such as hot air, at the first welding electrode 18 to supply heat to the electrode 18. The stream of heated gas 182 may initially impact the electrode body 76 and/or the weld face 78 of the first welding electrode 18. In another embodiment, as shown in FIG. 12, the external heating source 130 may include a laser beam head 190 that directs a laser beam 192 at the first welding electrode 18 such that the laser beam 192 impinges the electrode 18 to generate and supply heat to the electrode 18 without initiating melting. The laser beam 192 may impinge the first welding electrode 18 at any desired location on the electrode body 76 or the weld face 78. Still further, and while not shown in the Figures, a tube that carries superheated steam may be wrapped around the electrode body 76 of the first welding electrode 18 as a mechanism to supply heat to the electrode 18. The same basic control system described above can also be used to control the other types of external heating sources that may be employed, including those depicted in FIGS. 11-12.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of joining an aluminum workpiece and a steel workpiece, the method comprising:
   providing a workpiece stack-up that includes a first side presented by an aluminum workpiece surface and a second side presented by a steel workpiece surface, the workpiece stack-up comprising an aluminum workpiece and an adjacent overlapping steel workpiece, wherein a faying surface of the aluminum workpiece confronts a faying surface of the steel workpiece to provide a faying interface;
   providing a first welding electrode and a second welding electrode, the first welding electrode having a weld face that confronts the first side of the workpiece stack-up and the second welding electrode having a weld face that confronts the second side of the workpiece stack-up;
   heating the first welding electrode to raise a temperature of the first welding electrode to an elevated temperature that does not exceed a melting point of the aluminum workpiece;
   pressing the weld face of the first welding electrode and the weld face of the second welding electrode against the first side and the second side of the workpiece stack-up, respectively, while the first welding electrode is at the elevated temperature, the first weld face and the second weld face being pressed against their respective first and second sides of the workpiece stack-up in facial alignment with one another at a weld site;
   passing an electrical current between the weld face of the first welding electrode and the weld face of the second welding electrode to create a molten aluminum weld pool within the aluminum workpiece, the molten aluminum weld pool wetting the faying surface of the steel workpiece; and
   ceasing passage of the electrical current between the weld face of the first welding electrode and the weld face of the second welding electrode so that the molten aluminum weld pool solidifies into a weld joint that weld bonds the overlapping aluminum and steel workpieces together.

2. The method set forth in claim 1, wherein the act of heating the first welding electrode comprises:

limiting a flow of cooling fluid through the first welding electrode to less than a maximum flow rate or halting the flow of cooling fluid altogether; and supplying heat to the first welding electrode from an external heating source.

3. The method set forth in claim 2, wherein the act of supplying heat to the first welding electrode from the external heating source comprises passing an electrical current through a resistive heating element that contacts and encircles the first welding electrode.

4. The method set forth in claim 3, wherein the resistive heating element is a resistive wire wrapped around an electrode body of the first welding electrode.

5. The method set forth in claim 2, wherein the act of supplying heat to the first welding electrode from the external heating source comprises directing a stream of heated gas at the first welding electrode.

6. The method set forth in claim 5, wherein the heated gas is hot air.

7. The method set forth in claim 2, wherein the act of supplying heat to the first welding electrode from the external heating source comprises impinging the first welding electrode with a laser beam.

8. The method set forth in claim 1, wherein the elevated temperature of the first welding electrode is between 100° C. and 600° C.

9. The method set forth in claim 8, wherein the elevated temperature of the first welding electrode is between 200° C. and 500° C.

10. The method set forth in claim 1, further comprising:
controlling the temperature of the first welding electrode after passage of the electrical current between the weld face of the first welding electrode and the weld face of the second welding electrode has ceased, and with the first welding electrode still in contact with the aluminum workpiece, to maintain the temperature of the first welding electrode at a holding temperature that prevents full solidification of the molten aluminum weld pool at least until a temperature of the steel workpiece at the weld site cools to below the melting point of the aluminum workpiece.

11. The method set forth in claim 10, wherein the act of controlling the temperature of the first welding electrode to maintain the temperature of the electrode at the holding temperature comprises:
passing a flow of cooling fluid through the first welding electrode at a flow rate;
supplying an amount of heat to the first welding electrode from an external heating source; and
controlling the flow rate of the cooling fluid and the amount of heat supplied to the first welding electrode to achieve the holding temperature.

12. The method set forth in claim 11, wherein the act of supplying an amount of heat to the first welding electrode from the external heating source comprises at least one of:
(1) passing an electrical current through a resistive heating element that contacts and encircles the first welding electrode;
(2) directing a stream of heated gas at the first welding electrode; or
(3) impinging the first welding electrode with a laser beam.

13. The method set forth in claim 1, wherein the only workpieces included in the workpiece stack-up are the aluminum workpiece and the adjacent overlapping steel workpiece, such that a back surface of the aluminum workpiece constitutes the aluminum workpiece surface that presents the first side of the workpiece stack-up and a back surface of the steel workpiece constitutes the steel workpiece surface that presents the second side of the workpiece stack-up, or wherein the workpiece stack-up includes at least one additional aluminum workpiece disposed adjacent to the aluminum workpiece that lies adjacent to the steel workpiece or at least one additional steel workpieces disposed adjacent to the steel workpiece that lies adjacent to the aluminum workpiece.

14. A method of joining an aluminum workpiece and a steel workpiece, the method comprising:
providing a workpiece stack-up that includes a first side presented by an aluminum workpiece surface and a second side presented by a steel workpiece surface, the workpiece stack-up comprising an aluminum workpiece and an adjacent overlapping steel workpiece, wherein a faying surface of the aluminum workpiece confronts a faying surface of the steel workpiece to provide a faying interface;
pressing a weld face of a first welding electrode and a weld face of a second welding electrode against the first side and the second side of the workpiece stack-up, respectively, while a temperature of the first welding electrode is at an elevated temperature that does not exceed a melting point of the aluminum workpiece, the first weld face and the second weld face being pressed against their respective first and second sides of the workpiece stack-up in facial alignment with one another at a weld site
passing an electrical current between the weld face of the first welding electrode and the weld face of the second welding electrode to create a molten aluminum weld pool within the aluminum workpiece, the molten aluminum weld pool wetting the faying surface of the steel workpiece;
ceasing passage of the electrical current between the weld face of the first welding electrode and the weld face of the second welding electrode to allow the molten aluminum weld pool to solidify into a weld joint; and
controlling the temperature of the first welding electrode after passage of the electrical current between the weld face of the first welding electrode and the weld face of the second welding electrode has ceased, and with the first welding electrode still in contact with the aluminum workpiece, to maintain the temperature of the first welding electrode at a holding temperature that prevents full solidification of the molten aluminum weld pool into the weld joint until a temperature of the steel workpiece at the weld site cools to below the melting point of the aluminum workpiece.

15. The method set forth in claim 14, wherein the temperature of the first welding electrode is brought to the elevated temperature by heating the first welding electrode, the heating of the first welding electrode comprising:
limiting a flow of cooling fluid through the first welding electrode to less than a maximum flow rate or halting the flow of cooling fluid altogether; and
supplying heat to the first welding electrode from an external heating source.

16. The method set forth in claim 14, wherein the act of controlling the temperature of the first welding electrode to maintain the temperature of the electrode at the holding temperature comprises:
passing a flow of cooling fluid through the first welding electrode at a flow rate;
supplying an amount of heat to the first welding electrode from an external heating source; and controlling the flow rate of the cooling fluid and the amount of heat supplied to the first welding electrode to achieve the holding temperature.

17. A method of joining an aluminum workpiece and a steel workpiece, the method comprising:

providing a workpiece stack-up that includes a first side presented by an aluminum workpiece surface and a second side presented by a steel workpiece surface, the workpiece stack-up comprising an aluminum workpiece and an adjacent overlapping steel workpiece, wherein a faying surface of the aluminum workpiece confronts a faying surface of the steel workpiece to provide a faying interface;

pressing a weld face of a first welding electrode and a weld face of a second welding electrode against the first side and the second side of the workpiece stack-up, respectively, with the first weld face and the second weld face being pressed against their respective first and second sides of the workpiece stack-up in facial alignment with one another at a weld site;

passing an electrical current between the weld face of the first welding electrode and the weld face of the second welding electrode to create a molten aluminum weld pool within the aluminum workpiece, the molten aluminum weld pool wetting the faying surface of the steel workpiece;

ceasing passage of the electrical current between the weld face of the first welding electrode and the weld face of the second welding electrode to allow the molten aluminum weld pool to solidify into a weld joint; and controlling a temperature of the first welding electrode after passage of the electrical current between the weld face of the first welding electrode and the weld face of the second welding electrode has ceased, and with the first welding electrode still in contact with the aluminum workpiece, to maintain a temperature of the first welding electrode at a holding temperature that prevents full solidification of the molten aluminum weld pool into the weld joint until a temperature of the steel workpiece at the weld site cools to below a melting point of the aluminum workpiece.

18. The method set forth in claim 17, further comprising:

heating the first welding electrode to raise the temperature of the first welding electrode to an elevated temperature that does not exceed the melting point of the aluminum workpiece prior to passing the electrical current between the weld face of the first welding electrode and the weld face of the second welding electrode to create the molten aluminum weld pool; and pressing the weld face of the first welding electrode against the first side of the workpiece stack-up at the weld site while the first welding electrode is at the elevated temperature.

19. The method set forth in claim 18, wherein the act of heating the first welding electrode comprises:

limiting a flow of cooling fluid through the first welding electrode to less than a maximum flow rate or halting the flow of cooling fluid altogether; and supplying heat to the first welding electrode from an external heating source.

20. The method set forth in claim 17, wherein the act of controlling the temperature of the first welding electrode to maintain the temperature of the electrode at the holding temperature comprises:

passing a flow of cooling fluid through the first welding electrode at a flow rate;

supplying an amount of heat to the first welding electrode from an external heating source; and controlling the flow rate of the cooling fluid and the amount of heat supplied to the first welding electrode to achieve the holding temperature.

* * * * *